United States Patent

[11] 3,588,520

| [72] | Inventors | Philip Barkan<br>Media;<br>Peter Kotos, Havertown, Pa. |
|------|-----------|---------|
| [21] | Appl. No. | 872,000 |
| [22] | Filed | Oct. 29, 1969 |
| [45] | Patented | June 28, 1971 |
| [73] | Assignee | General Electric Company |

[54] HIGH-VOLTAGE ELECTRIC CIRCUIT BREAKER WITH HIGH-SPEED STRIPPING MEANS
6 Claims, 2 Drawing Figs.

[52] U.S. Cl................................................. 307/112,
200/48, 317/59
[51] Int. Cl.................................................. H01h 31/00
[50] Field of Search........................................... 317/59, 60,
317.9 (X), (Inquired), 60.1; 200/48, 148;
307/112, 149, 109; 320/1

[56] References Cited
UNITED STATES PATENTS

| 2,417,524 | 3/1947 | Slomer | 317/59X |
| 2,584,710 | 2/1952 | Johnson | 317/59X |
| 3,185,895 | 5/1965 | Easley | 317/59 |

Primary Examiner—Robert K. Schaefer
Assistant Examiner—William J. Smith
Attorneys—J. Wesley Haubner, Frank L. Neuhauser, Oscar B. Waddell and Joseph B. Forman

ABSTRACT: Relates to a high-voltage electric circuit breaker with high-speed tripping means comprising a capacitor located in a region of line potential. Tripping is effected by discharging the capacitor. The capacitor is maintained in a charged condition by means comprising a hydraulic motor in the region of line potential, a pump in a region of ground potential, and a hydraulic circuit interconnecting the pump and motor. The hydraulic circuit has portions extending between said line potential region and said ground potential region which are primarily of electrical insulating material.

PATENTED JUN 28 1971

3,588,520

INVENTORS:
PHILIP BARKAN,
PETER KOTOS,

BY William Freedman
ATTORNEY

HIGH-VOLTAGE ELECTRIC CIRCUIT BREAKER WITH HIGH-SPEED STRIPPING MEANS

This invention relates to a high-voltage electric circuit breaker in which high-speed tripping is produced by rapidly discharging a capacitor located in a region of high potential. The invention relates more particularly to means for supplying energy for maintaining the capacitor charged from a location of relatively low potential to said region of high potential.

For supplying circuit-breaker tripping energy from a region of low potential to a region of high potential, it is customary to rely upon a long rod of insulating material, as is shown for example (at 52) in U.S. Pat. No. 3,390,239—Miller. A disadvantage of this approach is that the operating speeds attainable with such a long rod are limited by the relatively high mass of the rod, by the time needed for wave propagation along the length of the rod, and by stretch in the rod. To obviate the need for such a long insulating rod, we derive our tripping energy from a capacitor that is situated in the region of high potential. In order to maintain the capacitor in readiness for a circuit-breaker tripping operation at all times when the circuit breaker is closed, it is necessary that charging means operable independently of current in the high-voltage power line be provided for maintaining the capacitor charged during this entire period. It is possible to use current in or derived from the high-voltage line for effecting capacitor charging, but in some applications this is not feasible since there may be no line current present just prior to the instant when tripping may be required. Charging the capacitor form an energy source at ground potential is another approach that can be used, but most power-transmitting means capable of being used in such a location are quite costly because of the need to electrically insulate the low-potential portion of the power-transmitting means from its high-potential portion. For example, note the cascaded insulating transformers 75 of U.S. Pat. No. 3,315,056—Furukawa, which require expensive insulation between their primary and secondary windings.

An object of our invention is to provide inexpensive and simple means for supplying charging energy for a circuit breaker tripping capacitor from a region of low potential to a region of high potential without degrading the electrical insulation normally provided between these locations.

Another object is to provide energy-transmitting means of this type which can also be used to reduce the size of the circuit breaker contacts and contact supports.

For a better understanding of the invention, reference may be had to the following description taken in conjunction with the accompanying drawing wherein.

Figure 1:
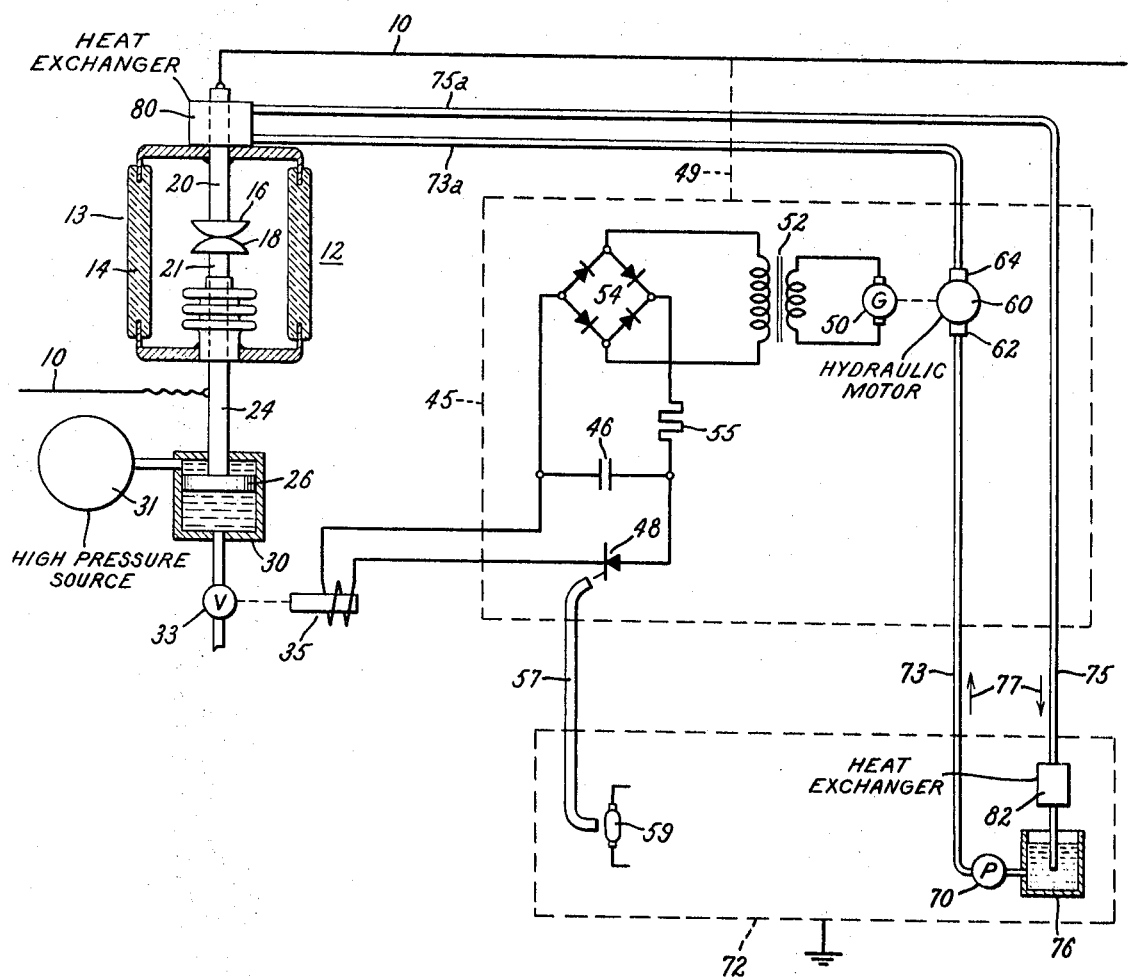
FIG. 1 is a schematic showing of a high-voltage circuit breaker embodying one form of the invention.

Referring now to FIG. 1, there is shown a high-voltage powerline 10 in which is connected an electric circuit breaker 12. The illustrated circuit breaker comprises a vacuum-type circuit interrupter 13 comprising a highly evacuated housing 14 and a pair of separable contacts 16 and 18 located therein. Contact 16 is a stationary contact, and contact 18 is a movable contact that engages the stationary contact when the circuit breaker is closed as shown. The contacts are mounted on conductive rods 20 and 21, which extend to positions outside the evacuated envelope and have outer ends which serve as terminals for the interrupter. Thus, when the contacts are engaged as shown, current passes through the interrupter via a path extending through parts 21, 18, 16 and 20.

Connected to movable contact 18 through short operating rod 24 is a piston 26 that is reciprocally mounted in a cylinder 30. When the breaker is in the position shown in FIG. 1, high-pressure fluid is present within cylinder 30 on both sides of the piston. Since the effective area of the lower side of the piston is greater than that of the upper side (because of the presence of operating rod 24), the pressurized fluid acting on the lower side urges the piston upwardly to hold the contacts in engagement. As shown in FIG. 1, a high-pressure source 31 is connected directly with the space at the upper side of the piston to maintain high-pressure fluid in this space.

The circuit breaker is opened by venting the space beneath the piston 26 to allow the pressurized fluid thereabove to drive the piston in a downward opening direction, thus driving movable contact 18 out of engagement with stationary contact 16. For venting the space beneath the piston 26, a suitable normally closed valve 33 controlled by solenoid 35 is provided. When solenoid 35 is operated, valve 33 is opened to vent the space beneath the piston 26, and the piston 26 responds by moving rapidly downward. Valve 33 is a conventional high-speed valve comprising a main valve assembly and a sensitive pilot valve assembly, the pilot valve assembly being operable by the solenoid to initiate opening of the main valve assembly. Since valves of this type are conventional, the valve 33 has been shown in schematic form only. Valve 33 and solenoids 35 are referred to hereinafter as triggering means for triggering the opening means (24, 26, 30) into operation.

In certain circuit breakers it is important to separate the contacts of the breaker as rapidly as possible once an opening signal is received. To permit the desired extreme high-speed opening, the piston 26, cylinder 30, valve 33, and solenoid 35 are located closely adjacent the circuit interrupter 13 and are at substantially line potential. Locating the cylinder and piston near the interrupter minimizes the length and mass of operating rod 24, and locating the valve 33 near the cylinder minimizes the amount of fluid which needs to be vented from beneath the piston 26 to initiate opening. Both of these factors contribute to higher speed opening of the circuit breaker. If the cylinder and piston had been at ground potential instead of line potential, an operating rod 24 of great length would have been required to withstand the high line-to-ground voltages, and this length and the resulting mass would considerably reduce the capability for high opening speed.

For supplying operating energy to the solenoid 35, a control, generally indicated at 45, is provided. This control is located closely adjacent the high-voltage line 10 and is at the same potential as the line, as indicated by the dotted line connection 49 between the line and the control. In the schematic illustration of FIG. 1, high-potential control 45 comprises a capacitor 46 across which is connected the series combination of the coil of the solenoid 35 and a normally off switching device 48. When switching device 48 is turned on, the capacitor discharges through the solenoid coil to open valve 33, thereby initiating a circuit-breaker opening operation.

The switching device 48 is shown as a light-activated silicon controlled rectifier (SCR). This is a normally nonconducting device which can be triggered into conduction by a light signal applied thereto, conduction starting when the effective irradiance of a light signal exceeds a predetermined threshold value. The light-activated SCR is a conventional device, and if a more detailed explanation thereof is desired, reference may be had to pages 205—217 of the Silicon Controlled Rectifier Manual, third edition, published in 1964 by General Electric Company. For supplying a light signal to the light-activated SCR 48, a light pipe 57 preferably of fiber optics is connected between the SCR 48 and a normally off light source 59 at ground potential. When the light source 59 is turned on, it emits a pulse of light that is transmitted through the light pipe to the SCR 48, turning on the SCR. The capacitor response to this turn-on by rapidly discharging through the SCR and the solenoid coil 35 to quickly operate the solenoid.

Although in the illustrated embodiment, the trip-initiating signal for the circuit breaker must be transmitted over the relatively great distance present between ground and the high-voltage line, it is capable of traversing this distance without significant time delay since it travels at the speed of light. The light source 59 is preferably a device, such as a xenon gas lamp, capable of emitting a pulse of light with a steep rate of rise of luminous intensity so that there is no significant delay in turning on the SCR after the pulse arrives at the SCR. Since the light pipe is a long member of electrical insulating material, it is capable of easily withstanding the high line-to-ground voltage present between its ends.

For charging the capacitor 46, we provide a small electrical generator 50 of conventional design, the output from which is supplied to a step-up transformer 52, the output from which is rectified by a conventional bridge rectifier 54 and is supplied as unidirectional current through a charging resistor 55 to the capacitor 46. For driving the electrical generator 50 in a preferred form of the invention, we provide a hydraulic motor 60 of conventional design, for example, the vane-type motor in which a rotor with suitable vanes (not shown) is rotated by pressurized liquid supplied to the motor through an inlet port 62 and leaving the motor through an exit port 64. A more detailed description of such a motor appears on page 30 of the Fluid Power Issue of the magazine, Machine Design, published by the Penton Publishing Co. on Sept. 19, 1968. The rotor of the generator 50 is suitably mechanically coupled to the rotor of the hydraulic motor so that the generator is driven by the hydraulic motor. All of the parts shown within the dotted line box 45 are at substantially line potential, as indicated by the dotted line connection 49.

For operating the hydraulic motor 60, we provide a rotary pump 70 of conventional design which is located in a region 72 of substantially ground potential. The motor 60 and the pump 70 are interconnected through a hydraulic circuit comprising a high-pressure supply line 73 and a low-pressure discharge line 75. The discharge from low-pressure line 75 is collected in a suitable sump 76. Pump 70 draws liquid from this sump, pressurizes it, and forces it through the circuit comprising elements 73, 60, 75 in the direction of arrows 77. In passing through the circuit, the pressurized liquid passes through hydraulic motor 60, thereby driving the motor as desired.

As seen in FIG. 1, the hydraulic lines 73 and 75 extend between the widely spaced-apart regions of low potential and high potential. For maintaining electrical isolation between these regions, the lines 73 and 75 are constructed of a suitable electrical insulating material. The operating liquid is also an electric insulator capable of maintaining the necessary electrical isolation between these two regions. Since the portions of the lines 73 and 75 extending between the high- and low-potential regions are quite long, the electrical stresses on these lines can be held to relatively low values, thus permitting relatively inexpensive insulating materials to be used for these lines.

In a preferred form of the invention, the pump 70 and the motor 60 are driven continuously. These components can be operated at relatively light loads, and thus can be relied upon to provide dependable service over extended periods of time.

Although not shown in the schematic drawing of FIG. 1, there is a long vertical column of insulating material atop which the interrupter 13, its operator 26—35, and the control 45 are mounted. This long insulator serves to support these high-potential parts and to isolate them from ground.

As pointed out hereinabove, a basic purpose of locating control 45 in a position of high potential is to reduce the response time required for initiating operation of the interrupter 13. We are able to further decrease this response time by using the low-pressure discharge from the hydraulic motor 60 to cool the contacts of the interrupter 13. By force-cooling the contacts in this manner, we can reduce their size and corresponding mass and thus can separate them at higher speeds.

In FIG. 1, we perform this cooling of the contact structure by providing a heat exchanger 80 on the stationary contact rod 20. This heat exchanger 80 is connected hydraulically in series with the motor 60 by portions 73a and 75a of the hydraulic circuit. Heat extracted from the contacts is transferred to the relatively cool liquid entering the heat exchanger 80 through line portion 73a. The discharge from the heat exchanger 80 passes via line 75 through another heat exchanger 82 at ground potential that cools the liquid and restores it to its original temperature.

Figure 2:
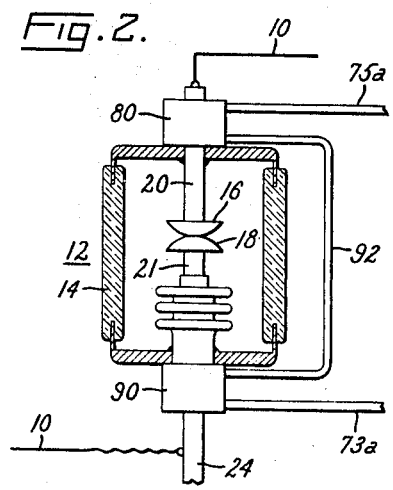
FIG. 2 is a schematic showing of a modification of the invention.

Still more effective cooling of the contact structure can be provided by using a heat exchanger on each of the contact rods of the interrupter. Such an arrangement is shown in FIG. 2, where an additional heat exchanger 90 is schematically shown disposed about the movable contact rod 21 of the interrupter. The two heat exchangers 80 and 90 are hydraulically connected in series by a line 92. Thus, the operating fluid entering through line portions 73a and leaving through 75a can efficiently extract heat from both contact rods, thereby permitting further reductions in the size of the contacts and contact rods.

Especially effective cooling of a vacuum interrupter can be performed with heat exchangers located on the contact rods because most of the heat passing from the interior to the exterior of the interrupter must pass through the rods inasmuch as the vacuum around the contact structure is an excellent heat insulator which blocks heat flow in a radial direction from the contact structure.

Although we normally prefer to use a control system of the hydraulic type for driving the generator 50, our invention in its broader aspects comprehends the use of a pneumatic control system for this purpose. In such a system, an air motor is used in place of hydraulic motor 60 and a blower or other pressure source is used in place of the pump 70 to supply pressurized fluid through insulating line 73 to the motor. The low-pressure air can be exhausted directly to atmosphere, thus obviating the need for a return line, such as 75. The term "fluid" as used herein comprehends both liquid and gas.

Although we show the pump 70 supplying pressurized fluid directly to the motor 60, it is to be understood that an accumulator or reservoir can be provided between the pump and motor to serve as a supply of pressurized fluid for additional utilization devices (not shown).

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

We claim:

1. In a high-voltage circuit breaker comprising separable contacts for conducting current through a high-potential line, opening means at substantially line potential for separating said contacts when triggered into operation, triggering means at substantially line potential for triggering said opening means into operation, and means for supplying operating energy to said triggering means comprising:
   a. a normally charged capacitor at substantially line potential dischargeable to supply operating energy to said triggering means;
   b. means for supplying energy to said capacitor to maintain a charge thereon comprising a fluid motor at location of substantially line potential;
   c. a pressure source at a location of relatively low potential for supplying pressurized fluid to said fluid motor to cause operation of said motor;
   d. a fluid supply circuit interconnecting said pump and said motor and comprising a line of electrical insulating material extending between said locations of low potential and line potential;
   e. said pressurized fluid being an electrical insulator.

2. In a high-voltage circuit breaker comprising separable contacts for conducting current through a high-potential line, opening means at substantially line potential for separating said contacts when triggered into operation, triggering means at substantially line potential for triggering said opening means into operation, and means for supplying operating energy to said triggering means comprising:
   a. a normally charged capacitor at substantially line potential dischargeable to supply operating energy to said triggering means;
   b. means for supplying energy to said capacitor to maintain a charge thereon comprising a hydraulic motor at a location of substantially line potential;
   c. a pump at a location of relatively low potential for supplying pressurized liquid to said hydraulic motor to cause operation of said motor;

d. a hydraulic circuit interconnecting said pump and said motor and comprising lines of electrical insulating material extending between said locations of low potential and line potential;
e. said pressurized liquid being an electrical insulator.

3. The circuit breaker of claim 2 in combination with:
a. heat exchange means for extracting heat from said contacts; and
b. means for hydraulically connecting said hydraulic circuit to said heat exchange means so that the liquid flowing through said hydraulic circuit receives an carries off heat extracted from said contacts.

4. The circuit breaker of claim 2 in combination with:
a. conductive rods on which said contacts are respectively mounted;
b. heat exchangers respectively disposed in heat exchange relationship with said rods; and
c. means for hydraulically connecting said hydraulic circuit to said heat exchangers, so that the liquid flowing through said hydraulic circuit receives heat extracted from said contacts via both of said rods.

5. The circuit breaker of claim 2 in which the means for supplying energy to said capacitor further comprises an electrical generator driven by said hydraulic motor, the generator being at a location of substantially line potential.

6. The circuit breaker of claim 5 in which the means for supplying energy to said capacitor further comprises a transformer energized by said generator and a rectifier energized by said transformer for developing a higher voltage unidirectional current for charging said capacitor, said transformer and rectifier being at a location of substantially line potential.